(No Model.) 3 Sheets—Sheet 3.
J. F. BENNETT.
APPARATUS FOR THE CONVEYANCE OF FLUIDS.
No. 312,318. Patented Feb. 17, 1885.
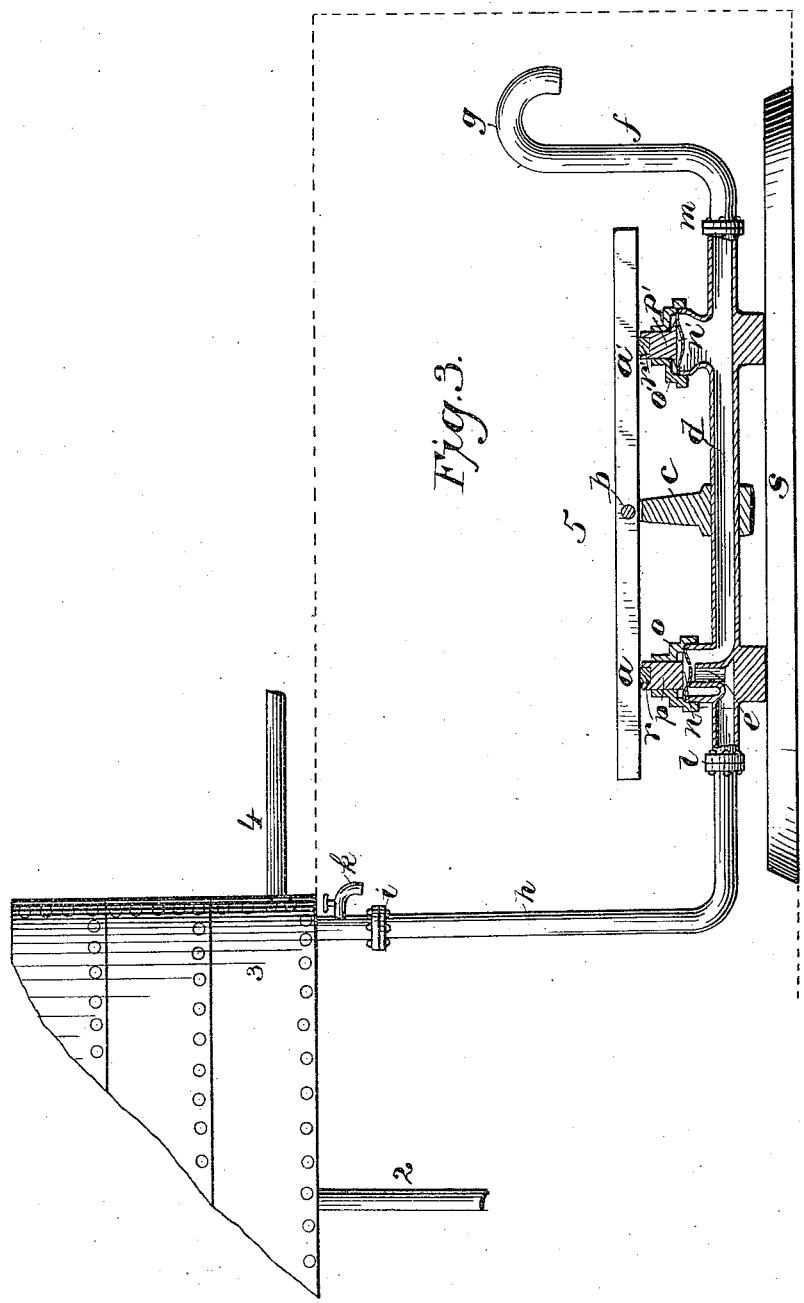

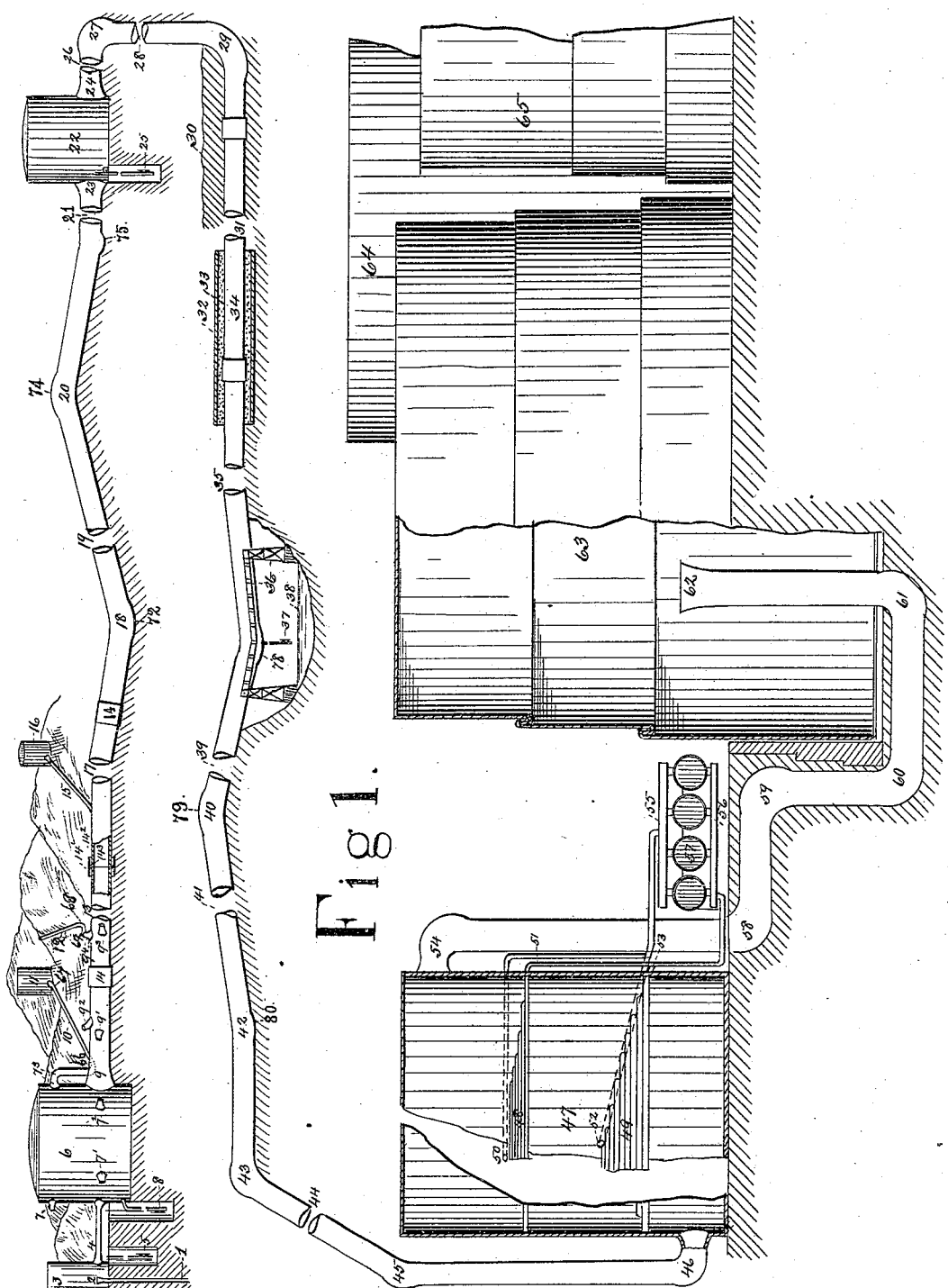

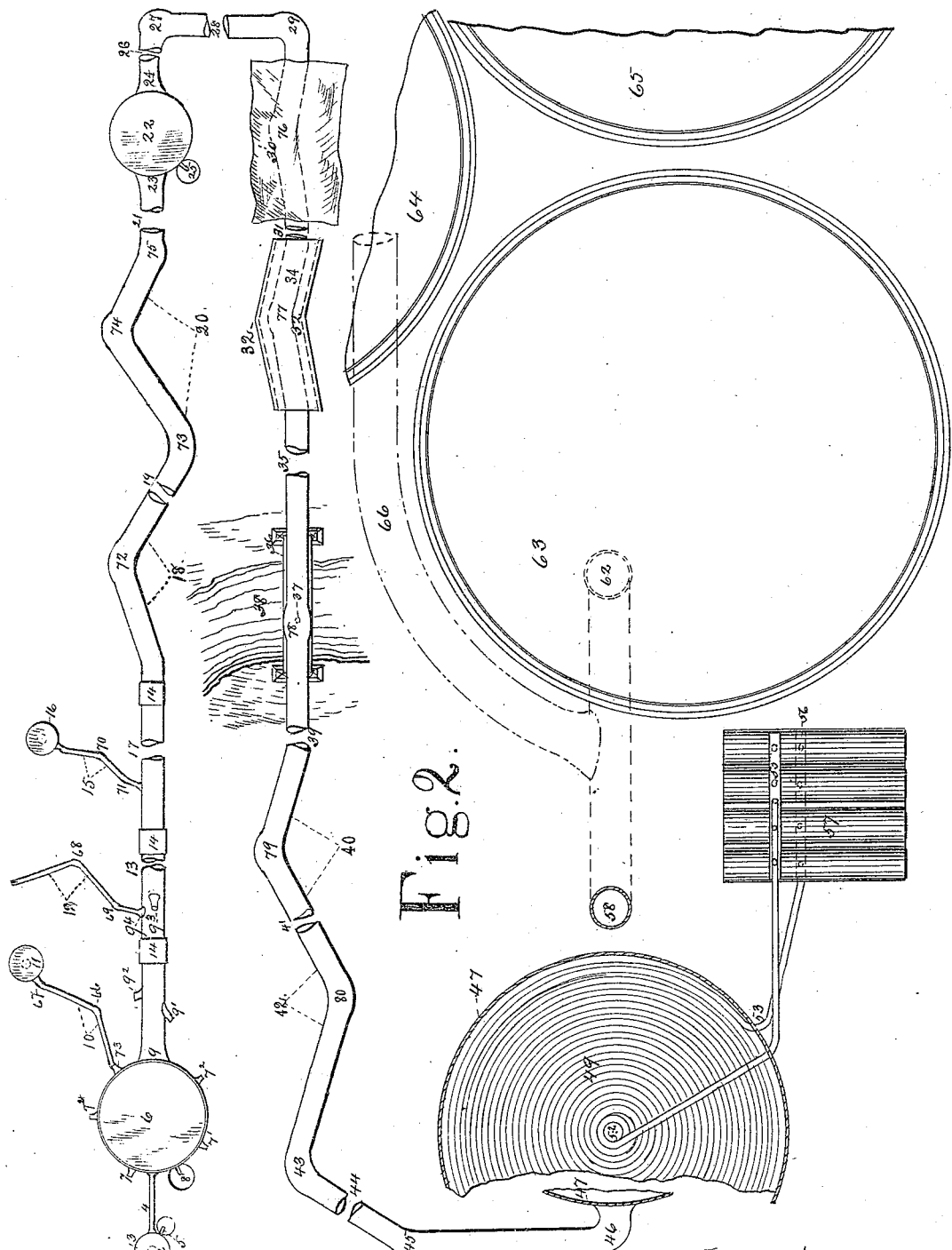

UNITED STATES PATENT OFFICE.

JOHN FRANCIS BENNETT, OF PITTSBURG, PENNSYLVANIA.

APPARATUS FOR THE CONVEYANCE OF FLUIDS.

SPECIFICATION forming part of Letters Patent No. 312,318, dated February 17, 1885.

Application filed December 3, 1883. (No model.)

*To all whom it may concern:*

Be it known that I, JOHN FRANCIS BENNETT, of Pittsburg, in the county of Allegheny and State of Pennsylvania, have invented a certain new and useful System (or Apparatus) for the Conveyance of Gas and Saline Fluids; and I do hereby declare that the following is a full, clear, and exact description thereof, reference being had to the accompanying drawings, and to the letters of reference marked thereon, which form part of this specification.

My invention relates to the conveyance of natural gas, either pure or saturated with salt-water; of manufactured illuminating-gas, either pure or charged with tarry, oily, and ammoniacal substances; of salt-water from saline wells and brine-springs, and, generally, the conveyance of all fluids corrosive to metallic conductors in their passage; and the objects thereof are, first, to supply such fluids for consumption economically, uninterruptedly, and of invariable pressure; second, to provide a conductor incapable of corrosive affection by such fluids; third, to present a smooth uniform surface to the passage of the fluids, of equal strength throughout, and, fourth, to shape and dispose the mains and pipes so that there shall be a minimum obstruction to the passage of the fluids afforded by them. I attain these objects by the system illustrated in the accompanying drawings, in which—

Figure 1 represents an elevation of the plant operatively showing my invention. Fig. 2 is a plan view thereof, and Fig. 3 is a detail view of the combined regulator and trap herein referred to.

The same designations indicate corresponding parts.

1 represents a pipe sunk in a natural-gas well, and 2 is its entrance into the tank or reservoir 3.

4 is a pipe connecting such reservoir with a holder or initial receiver, 6.

5 is an automatic pressure-regulator controlling the egress of gases from the tank.

7, 7', 7², 7³, and 7⁴ represent the entrances from various tanks to the gas-holder 6.

8 is an automatic pressure-regulator in communication with the gas-holder.

9 9' 9² 9³ 9⁴ represent entrances into the main from various tanks intermediate between the gas-holders 6 and 22.

10 represents a pipe connecting a gas-tank, 11, with the holder 6. It has bends 66 and 73.

12 is a pipe connecting a hidden tank with the main at the point 9⁴. It has a bend or curve, 69.

13 is a break in the main.

14 are joints connecting adjacent ends of the mains or pipes. They are composed of a sleeve, 14', and a packing, 14², (preferably of a non-corrosive putty of pulverized sulphate of barytes softened by boiled linseed-oil,) which serve to press together and tightly connect the bead or flange 14³ on the end of each contiguous pipe.

15 is a pipe connecting a gas-tank, 16, with the main. It has bends 70 and 71.

17 is a break in the main.

18 is a pipe conducting the fluid through a valley. It has a bend, 72.

19 is a break in the pipe.

20 is a pipe conducting the fluid over a summit. It has bends 73, 74, and 75.

21 is a break in the main.

22 is a small gas-holder having enlarged entrance 23 thereto, exit 24 therefrom, and gas-pressure regulator 25 in communication therewith.

26 is a break in the pipe.

27 is a swollen bend in the main.

28 is a break in the main.

29 is a bend in the main.

30 represents the pipe as being underground. It has a bend, 76.

31 is a break in the main.

32 is a closed trough surrounding the pipe at a place where it necessarily lies on the ground—for instance, as about to cross a stream—containing in the intermediate space, 33, cork shavings, asbestus, glass wool, pulverized charcoal, or other substances which are non-conductors of heat.

34 represents the main so inclosed. It has a bend, 77.

35 is a break in the main.

36 is a bridge.

37 is a gas-pressure regulator attached to the main at its bend 78.

38 is a stream.

39 is a break in the main.

40 is a bend in the main, and 41 a break thereof.

42 and 43 represent curves in the main, and 44 a break thereof.

45 and 46 represent bends in the main.

47 is a gas-holder (the terminal receiver) having flat foraminous floor 48 and conical floor 49.

50 is a pipe serving to admit steam to the upper floor of the holder, and 51 a similar pipe educting it therefrom.

52 is a pipe admitting steam to the lower floor of the holder, and 53 a similar pipe educting it therefrom.

54 is an enlarged outlet of gas from the holder.

55 and 56 are steam-drums, respectively, at the top and bottom of the boilers 57.

58 59 60 61 represent bends in the main, and 62 an enlarged exit therefrom.

63, 64, and 65 are telescopic gas-holders at the terminus of the route.

66, 67, 68, 69, 70, and 71 are curves in the small pipes.

72, 73, 74, 75, 76, 77, 78, 79, and 80 are curves or bends in the mains.

$a$ $a'$ represent the beam pivoted at $b$ to the standard $c$, whose base encircles the pipe $d$ of the regulator 5. From the ends $a$ $a'$ project lugs $r$ $r'$ embedded, respectively, in pins $p$ $p'$, whose bearings $o$ $o'$ guide and regulate the reciprocation. The bearings $o$ $o'$ are formed by nuts screwed on the regulator-trap casing. The reciprocation of the pins $p$ $p'$ is effected, respectively, by pressure transmitted through the valve $n$ and the diaphragm $n'$.

$e$ is a tube connecting the ends of the pipe $d$.

$f$ is the discharge-pipe, curved at $g$ in the form of a goose-neck.

$h$ is a pipe connecting the reservoir 3 with the pipe $d$.

$i$ $l$ $m$ are couplings having perforated disks.

$k$ is a stop-cock.

$s$ is the base of the regulator normally standing horizontally at the bottom of a small shaft adjacent to the reservoirs.

It will be understood that the eduction of the moisture and maintenance of a given pressure in the main can be effected in this manner, for as the gas, by reason of buoyancy, will pass through the pipe 4 and thence along the prescribed path, the moisture, by reason of gravity, will seek egress through the pipe $h$. The water discharged from the reservoir will remain in the reservoir side of the tube $e$ until its pressure exceeds that on the other side of the tubes $f$ $h$, or, in other words, when the fluid-pressure on the under side of the valve $n$ is greater than the atmospheric pressure on the diaphragm $n'$. The atmospheric pressure would be transmitted through a fluid column in case liquefied moisture has already passed the valve $n$. In that event the pressure of the fluid column in pipe $h$ must surpass the combined effect of the gravity of the water in the other end of the pipe $d$ and of the atmospheric pressure. By successive accretions to the volume on the discharge side of the valve $n$ the fluid columns on both its sides will finally balance, and then the effect of the depression of the diaphragm $n'$, caused by the descent of the pin $p'$, due to the corresponding upward movement of the pin $p$ in forming an air-chamber, will be utilized in disturbing the equilibrium by raising the column in pipe $f$ until it is discharged into the soil.

I am aware that heretofore a regulator-trap and means for heating the gas have been applied to conduits for conveying natural gas. It will be understood that in my invention the object of the heated reservoir is different from that heretofore used, and the regulator-trap is of an improved form, such as herein described.

All the straight pipes are constructed according to a principle of my invention covered by Patent No. 298,657, granted to me May 13, 1884, to wit: A straight pipe has bell-mouthed ends, which have areas at those points equal to about twice that of the body of the main pipe, the length of conical frusta forming them being equal to about two diameters of the body of the main pipe.

All the curved pipes are constructed according to a principle of my invention covered by Patent No. 298,059, granted to me May 6, 1884—to wit, a curved pipe whose cubical capacity from base to base of the curve equals that of a section of the main pipe whose length is the same as the outer line of the curve. This system is devised to convey gas from the natural wells in the Pittsburg district of Pennsylvania to various points of utilization, and the idea is to conduct the gas of great pressure over long distances by its natural energy, and to use that of less pressure at points nearer the source.

Heretofore wrought or cast iron pipes have been used to convey both natural gas for heating and artificial gas for illuminating purposes. As the natural gas issues from its subterranean bed at a pressure varying from twenty to eight hundred pounds per square inch, these metallic conductors were the only ones found suitable. In practice these are found to erode rapidly, externally because of the moisture and air of the earth in which they are embedded, and internally from the corrosive action of the salt-water mechanically suspended in the gas, and of the chlorides of sodium, calcium, and magnesium, and bromides and iodides of sodium dissolved in the water emanating from saline wells and brine springs. Cast-iron pipes for the conveyance of artificial gas from bituminous coal—whose only requisite condition is tightness of the joints, for the pressure is slight—are also open to the same objections in a modified degree. It is also found that the action of the moist saline ingredients on both wrought and cast iron is peculiar in that while it erodes the entire inner surface of the pipe it attacks certain parts thereof with more violent energy, making round, oval, or bean shaped holes through the plate until the pipe is unfitted for further service and incapable of repair. This is illustrated on a small scale in the effect on kitchen-boilers by this same action, wherefore some scarcely last more than four years, while the average life is placed at ten years. Also, cast-iron pipes used in the conveyance of fluids under pressure have to be made of excessive thickness, because of the practical impossibility to cast them free from "blow-holes" or "draw-holes," for the strength is gaged by its weakest part. For example, a cast-iron pipe of four feet inner diameter (the size contemplated to convey natural gas from Pittsburg to Chicago) requires to have its wall, even when carefully cast, one and a half inch thick to withstand the pressure of the water delivered from the reservoirs to the city of Pittsburg, whereas if such pipes were free from blow-holes or draw-holes two-thirds of that thickness would suffice. Under these favorable circumstances, however, a large proportion are condemned and have to be remelted at a cost which must be added to that of the sound ones. Other metals—as copper—which are less subject to erosion, are out of competition by reason of the greater thickness required and the increased first cost of the material. An important objection, moreover, to cast-iron conductors is the roughness of their surfaces and the consequent obstruction they offer to the passage of the fluids, thus materially reducing in long distances the volume delivered at the point of supply from a given pressure at the source. It is meant here to distinguish between "friction" and "obstruction," the former being the capillary attraction which a fluid has for the wall of the pipe however smooth, and the latter the absolute stoppage of the fluid against excrescences on the wall of the pipe, and which contract its area at that point. A pipe may be instanced in this district of five and five-eighths inches diameter, conveying gas which issues at two hundred pounds pressure per square inch, and delivering it some eighteen miles distant at only sixty pounds. It cannot be assumed that this loss of one hundred and forty pounds per square inch is due to friction alone, which does not amount to more than twenty pounds, but to leakages and obstructions, such as contracting the area of the pipe at its many elbows and the roughness of the inner surface. In a distance of eighteen miles there are one hundred and fifty each of vertical and horizontal deviations from a straight line approximately. To obviate these objections, I change, first, the material of the pipes to prevent obstructions due to roughness, and, second, I alter the construction of the pipes upon fixed principles of my invention set forth in Patents Nos. 298,657 and 298,059, to overcome obstruction due to contraction of the fluid area, with these incidental advantages, that the relative cost of glass and cast or wrought iron is favorable to the former, and also that the relative wear points to the former as a preference, as it will not erode; hence, I make the pipe of my system of glass with thickness of wall strong enough to withstand the pressure to which it is subjected, in lengths of about twelve feet each. Glass pipes can be made out of blast-furnace slag in an open-hearth furnace of as great a resisting power to rupture, of the same weight and of three times the thickness, at less than one-half the cost of cast-iron pipes. I make the joints by surrounding the abutting ends of adjacent pipes with a wrought-iron sleeve about three-eighths of an inch thick, overlapping each end about six inches, with an intermediate space between the pipes and sleeve of a quarter of an inch, which I fill with a non-corrosive putty tightly packed. A putty composed of pulverized sulphate of barytes triturated and made pasty with boiled linseed-oil is well adapted to this purpose. I lay the pipes beneath the surface of the ground deep enough to be out of reach of frost. I have learned by close observation that expansion-joints are necessary. Where the earth is rocky or swampy along the line of the pipe, or a stream is to be crossed, or other reason exists why it should wholly or partially be carried above ground, the pipe is surrounded by non-conductors of heat inclosed in a trough and carried along the surface. Such substances as cork shavings, asbestus, glass wool, and pulverized charcoal are excellent to conserve heat. I take advantage of such lower levels as the valleys and where the pipe is carried over on bridges or viaducts to deflect the pipe downward at that point and attach to the swollen elbow a perpendicular pipe, varying in length with natural conditions, and have a pressure-regulator in communication therewith so disposed that should the perpendicular pipe become full, or nearly so, of liquid (being the settlings from the moist gas or waste wash-water passing along the pipe) its valve will open to educt the liquid. A regulator admirably adapted to these purposes is shown in Patent No. 209,602, granted to me the 5th day of November, 1878. As the resisting power of glass is greater than that of cast-iron, weight for weight, their specific gravities being, respectively, 2.5 and 7.5, and as the best cast-iron pipes have to be made of fifty per cent. greater thickness than would be necessary if they were free from draw-holes or blow-holes, and as pressed-glass pipes are practically free from defects, therefore a glass pipe whose wall is three inches in thickness is practically as strong as a cast-iron one whose wall is one and a half inch in thickness, while it is only two-thirds the weight of the latter. Obviously there are other modes of joining the pipes; but the one herein named is well adapted to the tight packing and holding of the cement. It is also in contemplation to convey salt-water from the Syracuse, New York, district to the anthracite coal-beds of the Lehigh Valley in Pennsylvania, to utilize the fine slack coal at the latter place in the manufacture of salt. No other pipe is so serviceable, for the reasons herein mentioned, as a glass pipe.

In laying the pipes care must be taken that in making the curves no part of the swollen curve is placed below a level, to prevent water from lodging. In such cases the elbow-pipes should be specially made with the swollen part on the upper side.

As it may be necessary to supply towns and factories along the line, a small tank-reservoir may be placed at such points, (the main pipe entering and leaving the reservoir through bell-mouthed enlargements, as herein explained,) from which these may be supplied through similarly-shaped pipes. The reservoir need not be of glass. I also erect water-tanks and steam-boilers at various points along the line to force hot, warm, tepid, or cold water into the pipes, according to their construction and the character of passing fluid, to dissolve and remove any crystals of salt deposited out of the atomized salt-water from the natural-gas well or saline spring. By preference, however, when the pipes are metal, I blow steam and hot water, and when glass, tepid water that will not cause their rupture, through the pipes. Occasionally it is convenient to allow these solvents to remain prolongedly in contact with such coated pipes. It is estimated that sixty-four wells are required having a pipe of six inches diameter projecting therefrom to supply the main pipe of forty-eight inches diameter.

As to the question of normal pressure, the following are approximate figures: Out of sixty-four average wells gas would issue in eight instances at three hundred pounds pressure; in eight at two hundred and seventy-five pounds; in eight at two hundred and fifty pounds; in eight at two hundred and twenty-five pounds; in eight at two hundred pounds; in eight at one hundred and seventy-five pounds; in eight at one hundred and fifty pounds, and in the last eight at one hundred and twenty-five pounds. This makes the average pressure for all two hundred and twelve and five-tenths pounds. Now, it is essential to get the pressure in the main pipe as high as possible—say two hundred and fifty pounds flowing pressure. To effect this it is necessary to attach pressure-regulators to the first eight wells, having their delivery so restrained as to give out a pressure of two hundred and fifty pounds and confine the excess in the well to serve as a nucleus for further drafts. Similarly with the wells emitting two hundred and seventy-five pounds. Those giving out the two hundred and fifty pounds are not restrained by a regulator. The other forty wells must have their regulator-valves so set that the gas shall accumulate in each until its pressure reaches two hundred and fifty pounds, and only that in excess thereof permitted to enter the main. In this event an additional number of wells must be bored and connected with the main. Those that cannot reach a pressure of two hundred and fifty pounds are utilized nearer to the source with another but similar plant.

It is constantly necessary to sink new wells both to provide for exhaustion of old ones and to find with what system they can be connected, when desired—i. e., whether with the one at home or that at a distance. If new wells do not prove as good as their predecessors for utilization, the average pressure can be reduced to two hundred or less by altering the regulator-valves. The gas flowing along the pipe at a velocity of about one thousand seven hundred feet per second expands as it enters the terminal gas-receiver into sixteen times its volume if the original pressure in the main pipe at its connection with the receiver was one hundred and twenty pounds, or into four times its volume if such pressure was forty pounds, thus delivering the gas in the terminal receiver at a little above atmospheric pressure. I place inside the receiver coils of pipes disposed in conical or horizontal floors, through which I force steam, as shown in the accompanying drawings and herein fully described, the water of condensation running by gravity back into the boilers. Thus the pipes are raised in temperature and their heat is taken up by the passing expanding gas, thereby raising it above the freezing-point of water before entering the oscillatory city gas-holders. The terminal gas-receiver may be drawn upon for consumption in cases where it is expedient to do without oscillatory gas-holders—as, for instance, to supply small towns or factories near to and along the main pipe-line, or in such sections or districts of large cities where it might be found inexpedient to erect oscillatory holders. The first terminal gas-receiver is a fixed non-oscillating tank whose functions are to receive the current, to induce expansion to a little above atmospheric pressure, raise the temperature above that at which water freezes, collect and discharge the liquefied moisture, and constitute a center for the ramifications to the various oscillatory city gas-holders uncontrolled. When the main reaches the terminus, it must be made to separate into about sixty-four six-inch pipes, each provided with its own pressure-regulator, each having a separate connection with the receiver. The receiver must be of sufficient strength to withstand sudden changes of pressure, for a regulator might break and afford free communication between the branch pipe and the receiver. So of the other receivers. Delicate pressure-gages must be attached to give warning of any increase of pressure and action consistent therewith promptly taken.

Although in the drawings I have represented only one large pipe from the first terminal gas-receiver into each oscillatory gas-holder, it may practically be preferred to employ numerous small pipes having each a pressure-regulator; also, though I have represented in the drawings only one terminal receiver, it may practically be preferable to have several. That connected with the main gas-pipe may be set by pressure-regulator to receive the gas at one-half the pipe-pressure, the second to receive from the first at one-fourth such pressure, the third to receive from the second at one-eighth thereof, and so on until by successive reductions it is of the proper pressure to pass into the city oscillatory gas-holders.

Although I have represented the gas during expansion to be raised in temperature by coils of steam-pipes, yet the vast amount of cold produced might be utilized in the cooling of air for refrigerating purposes by increasing the number of terminal first receivers, filling them with coils of large-sized copper pipes, through which the air is forced, and abstracting the heat thereof by the expansion of the passing gas. There may, at intervals along the main, be many such projections, as $9'\ 9^2$, &c., to tap neighboring wells along the line, and to provide for placing temporary parallel pipes while repairing leaks. One tank is shown in the drawings to receive and deliver the gas during such repair; but they may be placed at distances of ten miles apart along the line, and at each of such places, as well as all along the line, automatic pressure-regulators should be placed, which may be converted into stop-cocks by weighting the lever over the small diaphragm.

The branch pipes may be of any material.

Although I have described one line of pipe, it is obvious that two or more lines of pipe may be laid near to or parallel with each other, connected at intervals, so that in the event of obstruction or breakage at any point that part may be isolated and repaired without necessitating a stoppage of the current.

Having thus fully described my invention, what I claim, and desire to secure by Letters Patent of the United States, is—

1. The tapping-pipes, in combination with the tanks having regulator-traps, substantially as described, attached thereto.

2. A pipe-line of blast-furnace slag or equivalent having regulator-traps disposed at suitable intervals for the purpose specified, in combination with the holders stationed along the line.

3. A pipe-line such as herein specified, in combination with the terminal receiver for the purpose described, and which may be drawn upon for consumption.

4. The tapping-pipes and tanks having regulator-traps attached thereto, in combination with holders stationed along the line.

5. The combination, with the pipe-line, substantially as herein specified, and the terminal receiver, of terminal oscillatory gas-holders for the purpose described, which may be drawn upon for consumption.

6. The tapping-pipes and tanks or receivers, in combination with a glass or equivalent pipe-line in which each straight pipe has bell-mouthed ends which have areas at those points equal to twice that of the body of the main pipe, the length of conical frusta forming them being equal to two diameters of the body of the main pipe and each curved pipe, so that the cubical capacity from base to base of the curve equals that of a section of a body of the main pipe whose length is coterminous with the outer line of the curve.

In testimony that I claim the foregoing as my own I affix my signature in presence of two witnessses.

JOHN FRANCIS BENNETT.

Witnesses:
 J. J. McCORMICK,
 THOMAS A. McCORMICK.